(12) United States Patent
Giebel et al.

(10) Patent No.: US 6,396,993 B1
(45) Date of Patent: May 28, 2002

(54) OPTICAL FIBER BREAKAWAY APPARATUS AND METHOD

(75) Inventors: Markus A. Giebel; James P. Luther; Brian J. Gimbel; Otto I. Szentesi, all of Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/475,915

(22) Filed: Dec. 30, 1999

(51) Int. Cl.[7] ................................................. G02B 6/00
(52) U.S. Cl. ....................................... 385/136; 385/139
(58) Field of Search ................................. 385/136, 137, 385/139, 147

(56) References Cited

U.S. PATENT DOCUMENTS

| 4,684,161 A | * | 8/1987 | Egner et al. | ................ 385/136 |
| 4,684,211 A | * | 8/1987 | Weber et al. | ................ 385/136 |
| 5,863,083 A | * | 1/1999 | Giebel et al. | ................ 385/136 |
| 5,938,181 A | * | 8/1999 | Holden | ........................ 385/136 |

* cited by examiner

Primary Examiner—Cassandra Spyrou
Assistant Examiner—Euncha Cherry

(57) ABSTRACT

The challenge of pulling an optical fiber having a connector at its terminal end without incurring damage to the fiber or connector due to excessive pulling or bending is met by introducing a breakaway feature that disconnects the connectorized fiber from the pulling mechanism upon detecting excessive force. The breakaway feature may be positioned at several locations along the pathway connecting the optical fiber and the pulling force. In one embodiment the breakaway feature is disposed on a cover over the connectorized front end of the optical fiber. In other embodiments the breakaway element is inserted along the cord connecting the connectorized optical fiber to the pulling force.

12 Claims, 5 Drawing Sheets

OPTICAL FIBER BREAKAWAY APPARATUS AND METHOD

FIELD OF THE INVENTION

The present invention relates generally to mechanisms to prevent damage to optical fibers when pulling forces are applied and, in particular, to a breakaway feature that disconnects a connectorized optical fiber from an excessive pulling force.

BACKGROUND

It is often necessary to install or modify optical fiber connections within a cabinet enclosure or other confined space. An optical fiber may be required to ultimately interact with more distant equipment, requiring the fiber or an intermediary optical fiber to be pulled and bent through the architecture of the enclosure or even through a wall. As with most optical fiber manipulations, it is essential to protect the integrity of the optical fibers and their terminal connectors from excessive forces such as bending or pulling during routing and placement.

Applications such as telecommunications, data processing, and data storage employ fiber optic jumper cables as intermediaries when connecting a fiber optic circuit with external equipment. Fiber optic jumper cables are generally a single strand of optical fiber having a connector mounted on its terminal end, but may also be a plurality of optical fibers, and are designed to interconnect two other fiber optic devices or cables within a transmission system. For example, fiber optic jumper cables may connect the front side of a fiber optic patch panel to another patch panel or some other enclosure. In connecting these components, the fiber optic jumper cable is often pulled around other patch panels in very limited spaces by applying a pulling device to the connector on the terminal end of the optical fiber. There are also instances in which an optical fiber having a connector, and not specifically a fiber optic jumper cable, must be routed through a complex enclosure or through a wall.

Routing optical fibers in confined areas requires consideration of the pulling forces applied to a fiber and its terminal connector, as well as potential excessive fiber bending. Pulling grips or other means for applying force may provide appropriate tension to guide the front end of an optical fiber through an enclosure, but their effect is difficult to regulate. The sensitivity of optical fibers and connectors to excessive force dictates that a force-guided manipulation should be well controlled to minimize fiber and connector damage. It is preferable to abandon a particular routing pathway that causes too much bending or friction, than to apply inordinate pulling force to the optical fibers and connectors.

The difficulties in applying appropriate pulling forces to connectorized optical fibers may be overcome by placing a "breakaway" component or intermediate force-sensitive device along the pulling pathway. This device would disengage the optical fiber from the pulling force at a predetermined pulling resistance, thereby protecting the optical fiber and its connector from damage and deterioration. The device of the present invention inserts a breakaway component along the path between the optical fiber being pulled and its pulling force. The breakaway device prevents damage to the optical fiber and connector by breaking at a predetermined tension, thereby allowing the user to reconfigure the routing to prevent damage to the fiber.

SUMMARY OF THE INVENTION

The device of the present invention operates by disconnecting a pulling force from a connectorized optical fiber at a predetermined tension. By separating an excessive pulling force from a connectorized optical fiber, both the fiber and the connector are protected from damage and remain functional. A force-sensitive breakaway component may be inserted along the pathway connecting a pulling force to at least one optical fiber, or the pulling line itself may have breakaway capabilities. A breakaway cap may also be placed over the front end of the optical fiber, such that a portion of the breakaway cap releases the pulling cord upon excessive pulling force.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention, and together with the description serve to explain the principles of the invention.

DETAILED DESCRIPTION

The present invention relates to breakaway devices for disconnecting the terminal end of a connectorized optical fiber from a pulling force. The breakaway device may be placed at different locations along the connection between the pulling force and the connector covering the optical fiber, depending upon the particular demands of the environment in which optical fibers are being routed or the characteristics of the optical fibers and connectors themselves. For situations in which it is preferable to disconnect the connector covering the optical fiber from the pulling force by breaking apart a portion of a clamshell cover, the first embodiment of the present invention is presented. Another embodiment of the invention has a breakaway piece on a connector cover that breaks when excess tension is applied. Another embodiment of the present invention utilizes a breakaway component in a device that is along the line connecting the front end of the connectorized optical fiber and the pulling force.

Figure 1:
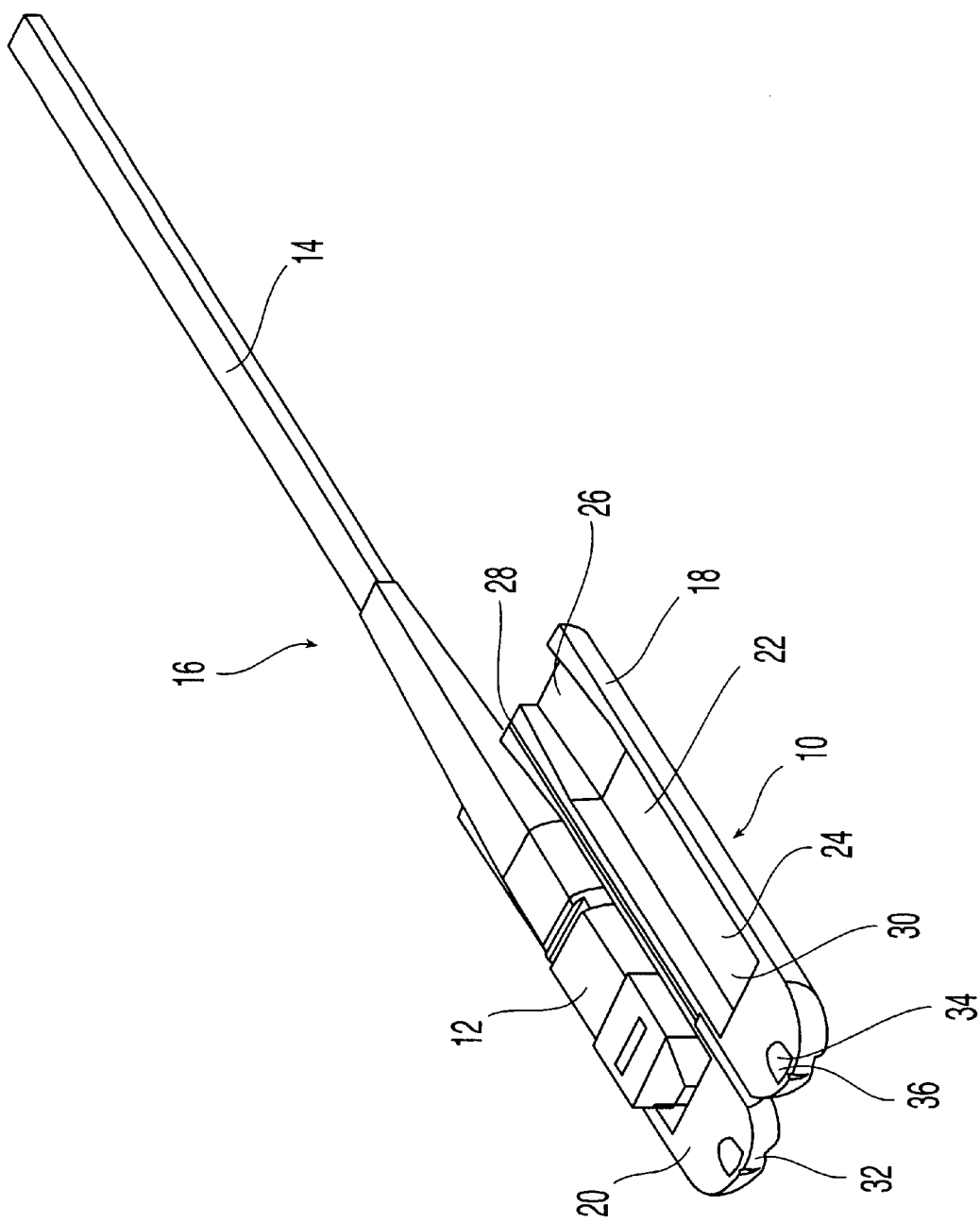
FIG. 1 is an isometric view of a breakaway component in an open configuration with a connectorized optical fiber according to a first embodiment of the present invention.
Figure 2:
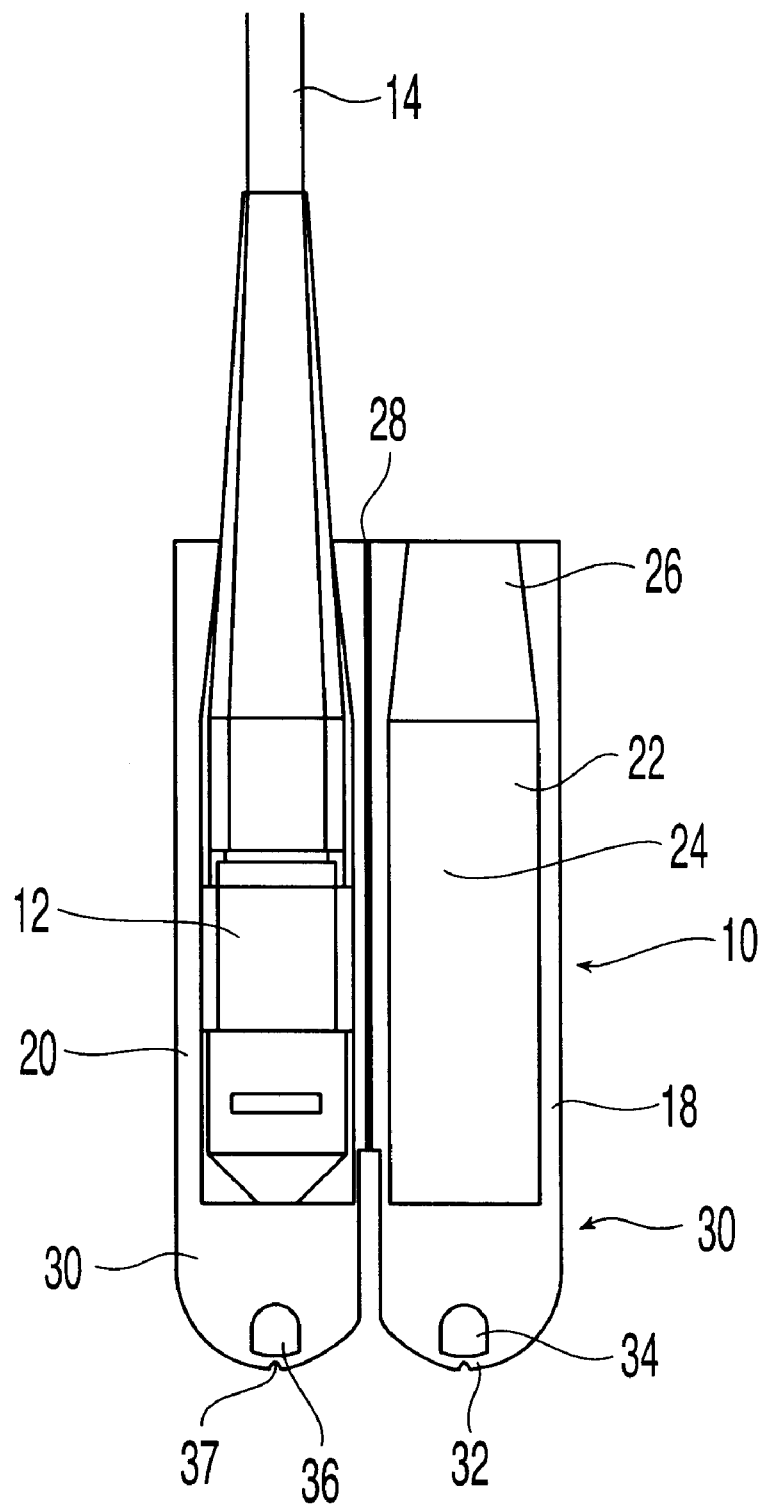
FIG. 2 is a top view thereof.

Referring to the first embodiment in FIG. 1, a breakaway cap 10 is shown holding a connector 12 mounted on an end of an optical fiber 14, employing standard mounting techniques, including strain relief using, for example, a crimp body and crimp ring to hold strength members (e.g., Kevlar® fibers) associated with the optical fiber. The breakaway cap 10 is preferably of a elongated clamshell design, in which a first segment 18 and a second segment 20 are connected by a hinge element 28, but any shape would be possible. The cap 10 is shown in FIG. 1 and FIG. 2 in an open configuration. An optical fiber 14, which is shown as ribbon cable, but could be of any type or configuration, has a connector 12 mounted on a first end 16 of the optical fiber 14 and is held in recess 22 defined by the inner surface 24 of the breakaway cap 10. The holding recess 22 preferably has a shape that closely corresponds to the connector 12, and preferably engages the connector 12 at the second end 26 of the recess 22 where is it is narrower than at the first end 30, preventing the connector from pulling out of the cap 10.

When the connector 12 mounted on the optical fiber 14 is placed into the holding recess 22, the first and second segments 18, 20 of the cap 10 cooperate to enclose the connector 12. The connector 12 and the front end 16 of the optical fiber 14 are securely held by the closed breakaway cap 10 and resist dislocation toward the second end 26 of the cap 10 due to the narrowing of the holding recess 22 at the second end 26 and larger width of the connector 12. While cap 10 does not have any elements to secure it in the closed position (see FIG. 3), cap 10 may have such securing elements if so desired. However, the shape of recess 22 closely corresponds to the connector 12 and connector 12 may aid in keeping the cap 10 closed during operation. Additionally, as shown in FIG. 3, the first and second segments 18,20 are held together by the pulling cord 38, as described below.

A breakaway pulling loop 34 forms an opening at the first end 30 of the breakaway cap 10. A force-sensitive tongue 32, contiguous with the material of the breakaway cap 10, extends from its first end 30 to circumscribe the outermost perimeter of the pulling loop 34. The material of the breakaway cap 10 and that of the force-sensitive tongue 32 of the pulling loop 34 are of a thickness and conformation that support up to a specified pulling force, so that the force-sensitive tongue 32 breaks apart releasing the pulling cord 38 when that force is exceeded. The force required to break through the tongue 32 depends on the specific connector and the strength members associated with the optical fiber. For larger connectors and larger numbers of optical fibers, the strength of the connection between the connector and the optical fibers/cable increases. Therefore, the larger the connector/number of fibers, the larger the force the connectorized optical fiber can withstand and the thicker the tongue 32 could be.

Figure 3:
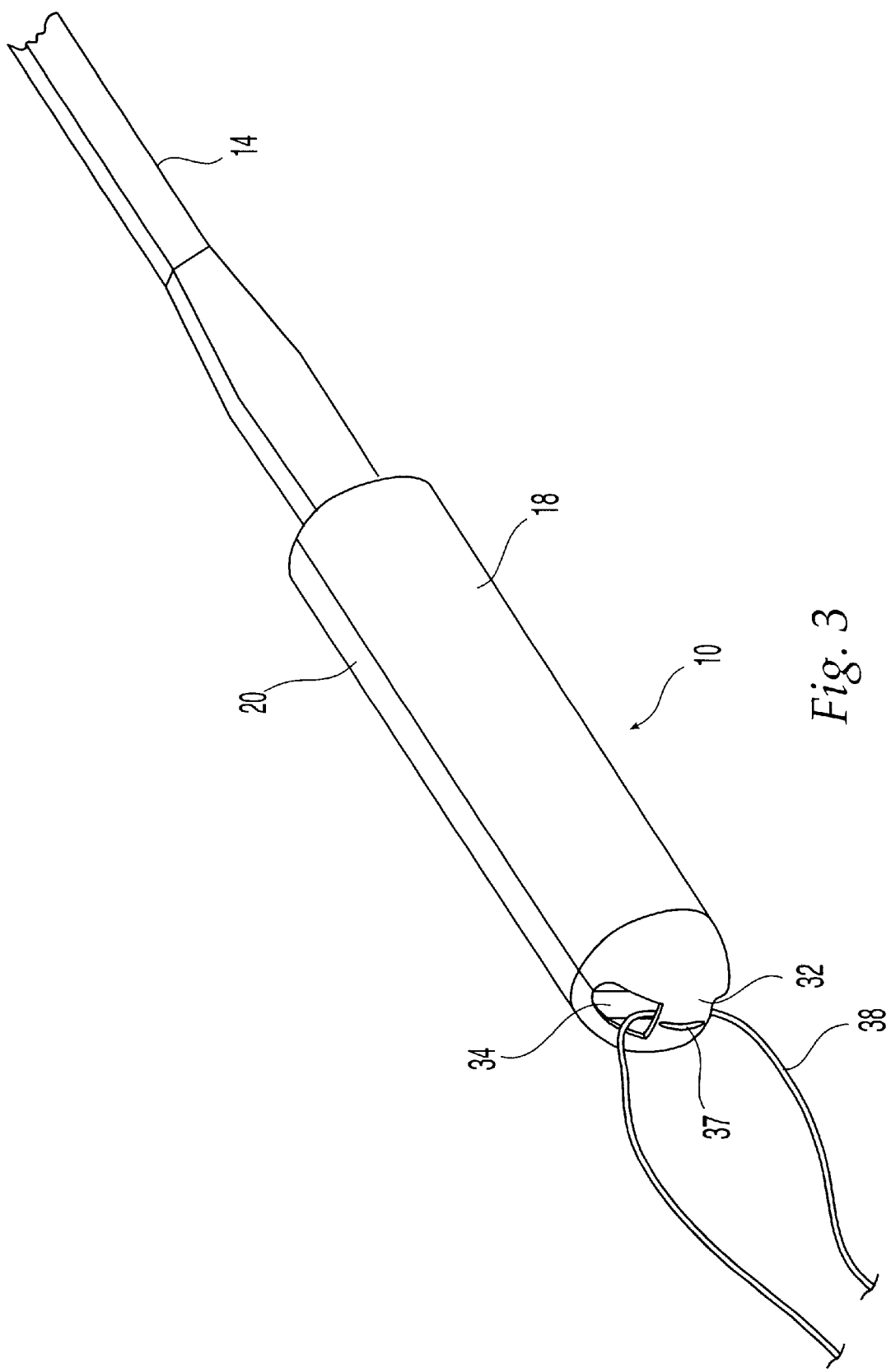
FIG. 3 is an isometric view of the breakaway component of FIG. 1 in a closed position with a pulling cord attached.

As best seen in FIGS. 2 and 3, the force-sensitive tongue 32 may have a notch 37 or have some other geometric design to facilitate the breakaway at a predetermined force. The pulling loop 34 is preferably shaped to facilitate placement of the pulling cord in the opening 36, so that the tension is applied at the tongue 32 to ensure proper operation.

As illustrated in FIG. 3, the pulling cord 38 may be passed through the pulling loop 34 of a closed breakaway cap 10 enclosing at least one connector 12 covering an optical fiber 14 and also be connected to a pulling device (not shown). The pulling cord 38 may be tied at the cap 10 to assist in keeping the cap 10 in a closed position during use. Alternatively, the cord 38 could be secured anywhere between the cap 10 and the pulling device. The force applied by the pulling device and transferred to the pulling cord 38 would draw the breakaway cap 10, the connector 12, and optical fiber 14 along the pathway routed by the cord 38. If force were applied in excess of that permitted by the configuration of the breakaway cap 10, the force-sensitive tongue 32 would break apart, thereby releasing the pulling cord 38 that had been fastened to pull the optical fiber 14. A connectorized optical fiber 14 housed within the breakaway cap 10 could then be drawn back to its original location, and another attempt (using another cap 10) to position the optical fiber 14 could commence. Advantages of the breakaway cap 10 include its protective capabilities in covering the front end of the optical fiber 14 and connector 12, as well as its ease in replacement once the optical fiber has been drawn back to its starting position for re-routing. As the breakaway cap is a single element, no assembly of multiple parts is required.

Figure 4:
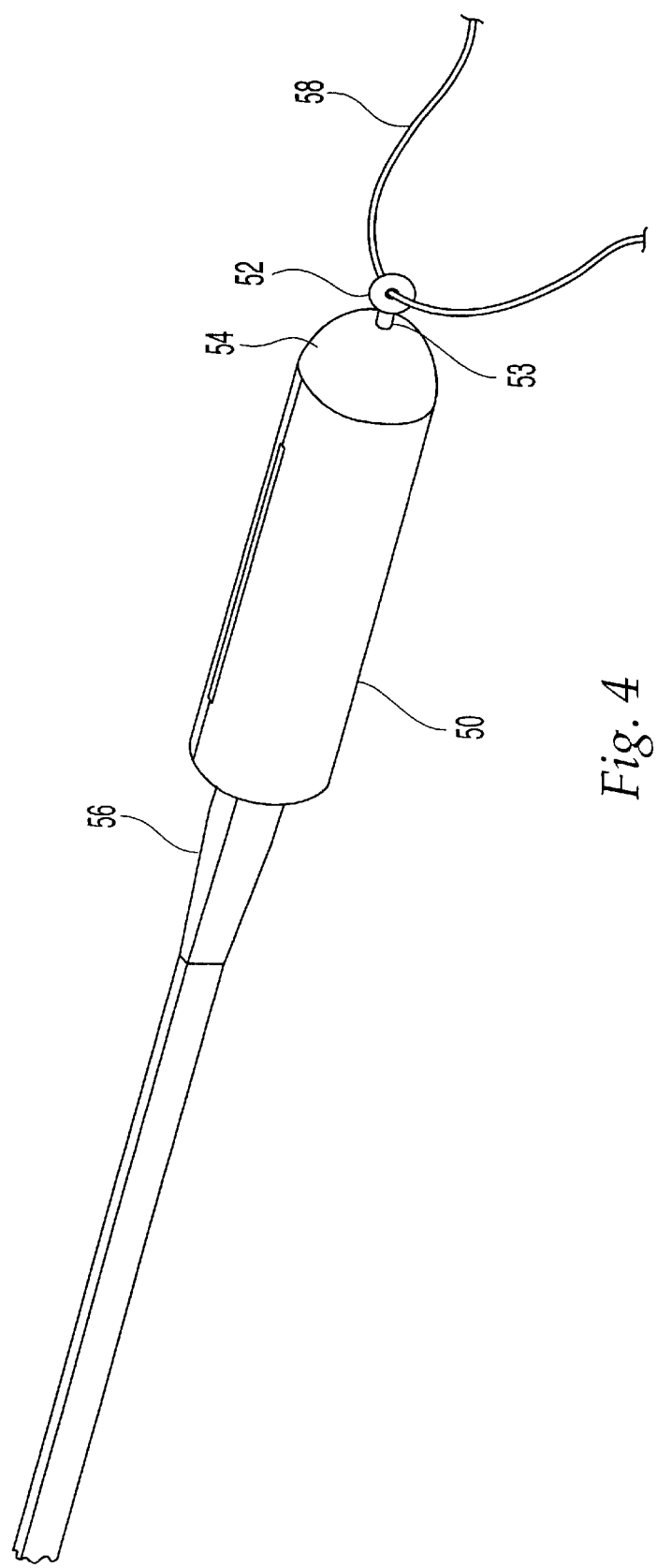
FIG. 4 is an isometric view of a breakaway component in a closed position with a pulling cord attached according to a second embodiment of the invention.

An alternative to connecting the pulling cord to a pulling loop on the breakaway cap would be to mount a breakaway knob on the outer surface of a breakaway cap. As shown in the embodiment in FIG. 4, a closed breakaway cap 50 having a breakaway knob 52 on its front end 54 may be used to secure a pulling cord 58 to a connectorized optical fiber 56. The knob 52 is connected to the cap 50 by a piece 53, which may also have a notch as in the first embodiment, having a reduced diameter relative to the cap 10. The reduced diameter piece 53 is designed to break at a predetermined force. As in the first embodiment, the breaking force is dependent on the connector and the strength members associated with the optical fiber.

Figure 5:
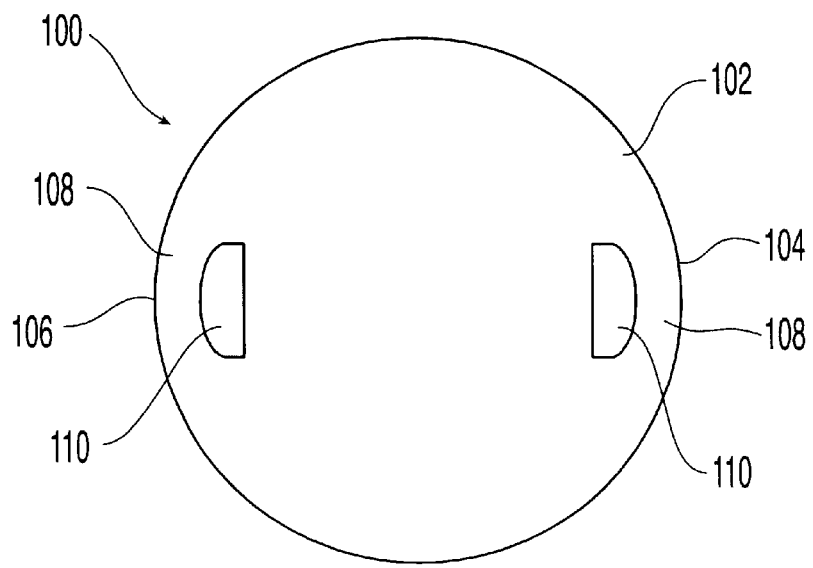
FIG. 5 is a top view of a breakaway component according to another embodiment of the invention.

Another embodiment of the present invention positions a breakaway element along the path of the pulling cord connecting a connectorized optical fiber and a pulling force. Referring to FIG. 5, a breakaway element 100 is shown that has a rounded body 102, with a first pole 104 and second pole 106. While a round body is shown, any shape or dimension is acceptable, although bodies that are smaller and with no sharp edges to catch are preferable. Each pole (104, 106) has a force-sensitive portion 108 defining a pulling opening 110. Pulling cords may be secured through each opening 110 at each pole (104, 106), and one of the poles would then connect with a connectorized optical fiber and the other pole with a pulling force.

As an alternative to a pulling opening 110 covered by a force-sensitive portion 108 that breaks upon reaching excessive pulling force, the element 100 may also comprise a body 102 that employ breakaway knobs, as shown above in FIG. 4 or a combination of the openings 110 and the knobs. Furthermore, only one pole of the element 100 may have a breakaway portion 108 while the other pole may firmly retain its pulling cord.

Figure 6:
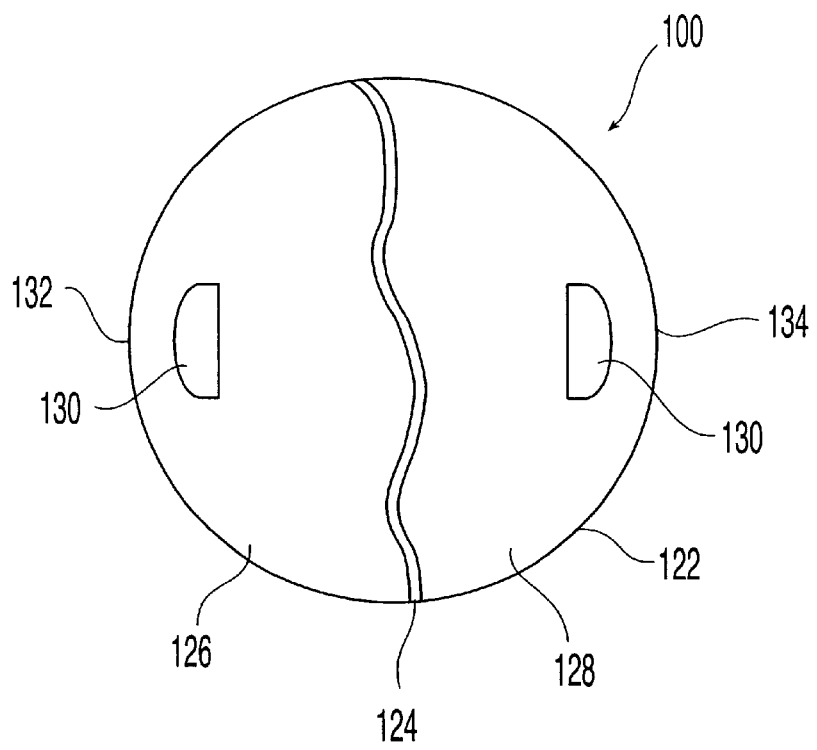
FIG. 6 is a top view of a breakaway component according to another embodiment of the invention.

Another embodiment is shown in FIG. 6. In this embodiment, the breakaway mechanism is similar to that shown in FIG. 5, but may also include of the body 122 of the element 100, rather than the pulling openings 130 at the first pole 132 or second pole 134. As shown in FIG. 6, a divider groove 124 traverses the circumference of the body 122, weakening the structure of the breakaway element 120 such that the element 120 breaks apart into a first segment 126 and a second segment 128, or even multiple smaller segments, upon reaching an excessive pulling force.

The breakaway cap (FIGS. 1–4) or breakaway element (FIGS. 5 and 6) could be fabricated from virtually any material ranging from metals to plastics, as long as the article breaking apart (e.g., the force-sensitive tongue, knob, or element) were of a strength that would permit appropriate pulling of optical fibers, but would break apart upon reaching a force limitation. The first embodiment having a clamshell design could be preferably made from molded plastic, facilitating installation and allowing for disposability.

Although the present invention has been described with respect to certain preferred and alternative embodiments, it should be understood that various changes, substitutions and modifications may be suggested to one skilled in the art, and it is intended that the present invention encompass such changes, substitutions, and modifications as fall within the scope of the appended claims and their equivalents.

We claim:

1. A breakaway device for preventing damage from excessive pulling force applied to at least one connectorized optical fiber comprising:
   a unitary body connectable to the at least one connectorized optical fiber, the body defining a holding recess to engaged the at least one connectorized optical fiber substantially within the body; and
   at least one attachment member in the body to engage a pulling cord;
   wherein a portion of the body breaks when a predetermined force is applied to the connectorized optical fiber.

2. The breakaway device of claim 1, wherein the attachment member is a pulling loop in the body.

3. The breakaway device of claim 2, the pulling loop comprising a tongue covering an opening recessed from the unitary body, said tongue being conformed to break apart at a predetermined force.

4. The breakaway device of claim 1, wherein the attachment member is a breakaway knob.

5. The breakaway device of claim 4, wherein the breakaway knob separates from the body when a predetermined force is applied to a pulling cord secured to the knob.

6. The breakaway device of claim 1, wherein the connectorized optical fiber has a connector mounted on an end portion of the optical fiber and the unitary body comprises a cap configured to hold the connector.

7. The breakaway device of claim 6, wherein the cap has a first portion and a second portion, at lease one of the first and second portions defining a recess to hold the connector.

8. The breakaway device of claim 1, wherein the at least one attachment member comprises a first attachment member attached to a second attachment member, and wherein the first attachment member is connected to a pulling force and the second attachment member is connected to the connectorized optical fiber.

9. The breakaway device of claim 8, wherein the unitary body is configured to separate into at least two portions when a pulling force exceeds a predetermined value, the first attachment member on a first portion and the second attachment member on a second portion.

10. A method for preventing damage to a connectorized optical fiber when a pulling force is applied, comprising:
    positioning a force-sensitive device along the pathway connecting an optical fiber to a pulling force, the device being connectable to the at least one connectorized optical fiber and having at least one attachment member in the body to engage the pulling force and a holding recess to engage the at least one connectorized optical fiber substantially within the device;
    applying a pulling force to the connectorized optical fiber and the device, wherein the connectorized optical fiber will disengage from the pulling force by breaking the force-sensitive device when a predetermined force is reached.

11. A breakaway device for preventing damage from excessive pulling force applied to at least one connectorized optical fiber comprising:
    a unitary body connectable to the at least one connectorized optical fiber;
    a first attachment member and a second attachment member disposed in the unitary body;
    wherein the first attachment member is for connecting to a pulling force and the second attachment member is for connecting to the connectorized optical fiber and wherein a portion of the body breaks when a predetermined pulling force is applied to the at least one connectorized optical fiber.

12. The breakaway device of claim 11, wherein the unitary body of the breakaway device is configured to separate into at least two portions when a pulling force exceeds a predetermined value, the first attachment member on a first portion and the second attachment member on a second portion.

* * * * *